3,341,281
FLUORINATION CATALYST PELLETS
Ralph A. Davis and Keith A. Allswede, Midland, Mich., assignors to The Dow Chemical Company, Midland, Mich., a corporation of Delaware
No Drawing. Filed Jan. 22, 1965, Ser. No. 427,515
4 Claims. (Cl. 23—88)

ABSTRACT OF THE DISCLOSURE

Chromium oxyfluoride fluorination catalyst pellets of high mechanical strength are prepared by pelleting hydrated chromic fluoride or its mixtures, with aluminum fluoride using graphite and starch as the pelleting lubricant and binder respectively and burning out the carbonaceous material.

---

The present invention relates to an improved method of forming chromium oxyfluoride fluorination catalyst pellets of superior strength and high catalytic efficiency. It also relates to a novel and advantageous combination of metal fluoride and pelleting lubricant and binder from which these pellets are formed.

It is known that chromium fluoride catalyzes the vapor phase reaction of hydrogen fluoride with brominated or chlorinated lower alkanes at elevated temperatures whereby one or more bromine or chlorine atoms are replaced by fluorine. U.S. 2,745,886 describes a chromium oxyfluoride catalyst of superior activity which is prepared by heating a polyhydrate chromic fluoride in the presence of oxygen. An improved chromium oxyfluoride catalyst containing aluminum fluoride is described in U.S. 3,002,934.

These prior art catalysts are described as being formed into pellets by pelleting a mixture of polyhydrated chromic fluoride, with or without added aluminum fluoride, with graphite or graphite plus sugar as lubricant and binder. The pellets are then activated by heating at 350–750° C. in the presence of oxygen whereby the hydrated chromic fluoride is converted to chromium oxyfluoride and the carbonaceous material is burned out of the pellets. The burned off pellets are catalytically active and while of usable strength, they are relatively easily broken and eroded during use so that there is actual loss of catalyst as dust and a consequent undesirable rise of resistance to gas flow through the catalyst bed. The practical life of these catalysts may thus be considerably shorter than their potential life because of the structural weakness of the catalyst pellets.

It has now been found that such chromium oxyfluoride catalysts are obtained as pellets having greatly increased resistance to breakage and dusting when the pelleting binder and lubricant is a mixture of graphite and starch in the proportion of 1–3 parts of graphite and 1–10 parts of starch per 100 parts of inorganic fluoride. It has further been found that the activated pellets are of equal or improved catalytic activity as compared to similar prior art catalyst pellets. Because of their increased strength, catalyst pellets formed according to this invention can have an effective life several times that of known chromium oxyfluoride catalysts.

By inorganic fluoride is meant a polyhydrate chromic fluoride or its mixture with up to four parts by weight of aluminum fluoride based on the weight of $CrF_3$ as the anhydrous salt. Polyhydrate chromic fluorides have the formula $CrF \cdot nH_2O$ where $n$ is greater than one and may be as large as nine. Hydrates where $n$ is three to four are preferred for their convenience in handling and their easier availability.

The term stach is used herein to include not only the common starches obtained from corn, potatoes, or arrowroot, but also vegetable flours which are largely starch such as rice flour, wheat flour, potato flour, and the like. The best catalyst pellets are obtained by using 2–6 parts of starch and 2 parts of graphite per 100 parts of fluoride.

When pellets are formed by this new method and their carbonaceous content is essentially all removed by contacting them with air or other oxygen-containing gas at 350–750° C., preferably at about 500° C., the chromium oxyfluoride pellets thereby obtained are hard, resistant to dusting, and possess a crushing strength several times that of pellets made by prior art methods. Typically, pellets made in the common cylindrical 3/16 or 1/4 inch sizes by the present process, when burned off or activated as described, show side crushing strengths of 10–20 lbs. whereas prior art pellets have crushing strengths of only 2–3 lbs. These high strengths are largely retained even after many hours of use in the fluorination process crushing strengths such as quoted are determined by pressing a single pellet between two flat surfaces with increasing measured force until the pellet breaks. Crushing strengths are customarily determined as side crushing strengths wherein the pressure is applied across the diameter of the cylindrical pellet.

Example 1

Technical chromic fluoride hemiheptihydrate

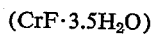

$(CrF \cdot 3.5H_2O)$ was thoroughly mixed with 4% by weight of powdered corn starch and 2% of powdered lubricating graphite. This mixture was formed by a pelleting press into 3/16 x 3/16 inch pellets which had a bulk density of 1.33 g./cc. and a side crushing strength of 24–26 lbs. A 200 cc. sample of these pellets was loaded into a 2 x 30 inch nickel tube and air at 0.5–1 liter/1 min. was passed through the bed of pellets at 500° C. for 4 hours. The activated chromium oxyfluoride pellets thereby obtained were free of carbon and were used as the catalyst for the fluorination of $CCl_4$ as shown in Example 2. The side crushing strength of the activated pellets was 18–20 lbs.

Example 2

The temperature of the reactor was adjusted to 250° C. and a gaseous mixture of HF and vaporized $CCl_4$ in 1.3/1 molar ratio was passed through the catalyst bed for 1 hour at this temperature at a rate to give a contact time of 4.6 seconds. The HF was completely reacted to yield a product consisting largely of HCl and chlorofluoromethanes with minor proportions of $CF_4$ and unreacted $CCl_4$. A 1.68/1 $HF/CCl_4$ mixture was then passed through the reactor at the same temperature but at a slower feed rate so as to provide a contact time of 8.4 seconds. The HF was again completely reacted to yield a similar product mixture containing a proportionally higher fluorine content. The efficiency of this catalyst in these runs was equal to or better than the chromium oxyfluoride catalysts prepared by pelleting hydrated chromic fluoride with graphite plus $CrO_3$ or with graphite alone as described in U.S. 2,745,886.

Similar high efficiencies were obtained when the catalyst of Example 1 was used to promote the reaction of HF with $CH_2Cl_2$ at 350° C. to produce $CH_2F_2$ and the reaction of HF with $CCl_3CH_2CH_2Br$ to give $CF_3CH=CH_2$. Additionally, this catalyst was found to maintain its activity at a high level even after many hours of use in these reactions without reactivation. When the catalyst pellets were examined after having been used in these runs, they were found to have retained their shape with little or no dusting or cracking. A random sample of twenty used pellets showed side crushing strengths of 16–22 lbs. as compared to crushing strengths of 2–3 lbs. shown by similar used catalysts which had been made by pelleting hydrated chromic fluoride with graphite or with graphite and sugar.

The present invention is also applicable to making stronger pellets of the improved chromium oxyfluoride-aluminum fluoride catalyst disclosed in U.S. 3,002,934 as useful in the same fluorination reactions. Compositions containing hydrated chromic fluoride with up to four parts by weight of aluminum fluoride based on the weight of anhydrous chromic fluoride present are formed into pellets of superior strength when the starch-graphite mixture of this invention is added as a lubricant and binder. The activated pellets obtained by burning off the graphite and starch as previously described also show high catalytic efficiency and extended catalyst life in the fluorination reactions.

Examples 3–5 illustrate the results obtained by pelleting hydrated chromic fluoride or mixed chromic and aluminum fluorides with graphite and starch combinations within the scope of the invention. Example 6 shows the inferior results obtained when another carbohydrate is substituted for the starch component.

*Examples 3–6*

The following mixtures were pelleted into ¼ x ¼ inch pellets and 200 cc. samples of the pellets were activated with air in a nickel tube reactor at 500° C. Air was passed through the catalyst bed at 100–150 cc./min. at 500° C. for two hours, then the direction of air flow was reversed and heating was continued under these conditions for another two hours. After cooling, the pellets were tested for average crushing strength using 30 pellet samples of each.

| Catalyst No. | Mixture, Parts by Weight | Crushing Strength | Remarks |
|---|---|---|---|
| 3 | 100 CrF·3.5 H₂O, 4 wheat flour, 2 graphite. | 11.3 | Very little dusting or breakage. |
| 4 | 80 CrF·3.5 H₂O, 20 AlF₃, 4 corn starch, 2 graphite. | 7.8 | Do. |
| 5 | 100 CrF·3.5 H₂O, 2 corn starch, 2 graphite. | 14.0 | Very little dusting or breakage; mixture difficult to pellet. |
| 6 | 100 CrF·3.5 H₂O, 4 powdered sucrose, 2 graphite. | | Most pellets disintegrated into dust or fragments upon activation. |

We claim:
1. A pelleted intimate mixture of 1–3 parts by weight of graphite, 1–10 parts of starch, and 100 parts of a fluoride composition consisting essentially of one part of $CrF_3$ as the polyhydrated salt and 0–4 parts by weight of aluminum fluoride.
2. The mixture of claim 1 wherein the fluoride composition is polyhydrated chromic fluoride.
3. A process for making an improved chromium oxyfluorination catalyst which comprises forming an intimate mixture of 1–3 parts by weight of graphite, 1–10 parts of starch, and 100 parts of a fluoride composition consisting essentially of one part of $CrF_3$ as the polyhydrated salt and 0–4 parts by weight of aluminum fluoride, compressing said mixture into pellets, and heating said pellets in an oxygen-containing gas at 350–750° C. until they are substantially free of carbonaceous material.
4. The process of claim 4 wherein the fluoride composition is polyhydrated chromic fluoride.

References Cited

UNITED STATES PATENTS

| | | | |
|---|---|---|---|
| 2,008,146 | 7/1935 | Morrell | 252—421 |
| 2,546,903 | 3/1951 | Morrell | 252—422 |
| 2,739,927 | 3/1956 | Doumani | 252—442 X |
| 2,745,886 | 5/1956 | Ruh et al. | |
| 3,002,934 | 10/1961 | Davis et al. | 252—442 |
| 3,079,266 | 2/1963 | Galy | 252—421 X |
| 3,197,417 | 7/1965 | Folkins | 252—442 |

OSCAR R. VERTIZ, *Primary Examiner.*

EDWARD STERN, *Examiner.*

UNITED STATES PATENT OFFICE
CERTIFICATE OF CORRECTION

Patent No. 3,341,281                             September 12, 1967

Ralph A. Davis et al.

It is hereby certified that error appears in the above numbered patent requiring correction and that the said Letters Patent should read as corrected below.

Column 1, line 31, for "polyhydrate" read -- polyhydrated --; column 2, line 1, for "Polyhydrate" read -- Polyhydrated --; line 2, for "$CrF \cdot nH_2O$" read -- $CrF_3 \cdot nH_2O$ --;

line 6, for "stach" read -- starch --; same column 2, line 35, for "$(CrF \cdot 3.5H_2O)$" read -- $(CrF_3 \cdot 3.5H_2O)$ --; column 4, in the table, second column, lines 1, 4, 8 and 11 thereof, for "$CrF \cdot 3.5H_2O$", each occurrence, read -- $CrF_3 \cdot 3.5H_2O$ --;

same column 4, line 24, for "oxy-" read -- oxyfluoride --.

Signed and sealed this 15th day of October 1968.

(SEAL)
Attest:

EDWARD M. FLETCHER, Jr.                      EDWARD J. BRENNER
Attesting Officer                               Commissioner of Patents